United States Patent [19]

Beni et al.

[11] 4,411,495

[45] Oct. 25, 1983

[54] REFRACTIVE INDEX SWITCHABLE DISPLAY CELL

[75] Inventors: Gerardo Beni, Old Bridge; Harold G. Craighead, Fair Haven; Susan Hackwood, Freehold, all of N.J.

[73] Assignee: Bell Telephone Laboratories, Incorporated, Murray Hill, N.J.

[21] Appl. No.: 254,509

[22] Filed: Apr. 15, 1981

[51] Int. Cl.³ .................. G02F 1/133; G02F 1/07; G02F 1/135; G02F 1/137

[52] U.S. Cl. .................. 350/347 V; 350/330; 350/331 R; 350/390

[58] Field of Search ........... 350/347 R, 347 V, 330, 350/331 R, 353, 355, 356, 357, 390, 391, 267, 347 E, 375, 346, 312, 313

[56] References Cited

U.S. PATENT DOCUMENTS

| | | | |
|---|---|---|---|
| 2,953,819 | 9/1966 | Holoubeck | 264/24 |
| 3,030,852 | 4/1962 | Courtney-Pratt | 350/96.25 |
| 3,390,933 | 7/1968 | Hovey et al. | 350/354 |
| 3,458,249 | 7/1969 | George | 350/354 |
| 3,832,033 | 4/1974 | Furuhata et al. | 350/339 R |
| 3,918,794 | 11/1975 | Milton | 350/347 |
| 3,951,520 | 4/1976 | Waring | 350/353 |
| 3,961,181 | 6/1976 | Golden | 350/331 R |
| 4,021,846 | 5/1977 | Roese | 350/331 R |
| 4,046,456 | 9/1977 | Bonne | 350/356 |
| 4,066,335 | 6/1978 | Courtney | 350/331 R |
| 4,097,128 | 6/1978 | Matsumoto et al. | 350/347 |
| 4,214,819 | 7/1980 | Pohl et al. | 350/330 |

OTHER PUBLICATIONS

Matsumoto et al., II, "New Multicolor Liquid-Crystal Display" *Toshiba Review* No. 108, Mar.-Apr. 1977, pp. 32-35.

Garnett, "Colours in Metal Glasses and in Metallic Film" *Phil. Trans. Roy. Soc.*, London, vol. 203, pp. 385-420, 1904.

Birks et al., Editor, *Progress in Dielectrics*, vol. 6, Academic Press Inc. New York 1965.

Marks, "Electro-Optical Characteristics", *Appl. Optics*, vol. 8, No. 7, Jul. 1969, pp. 1397-11412.

*Primary Examiner*—John K. Corbin
*Assistant Examiner*—David Lewis
*Attorney, Agent, or Firm*—Michael B. Einschlag; Gregory C. Ranieri

[57] ABSTRACT

A display cell having at least two states of different opacity, comprises a first material having a first index of refraction, a second material dispersed within the first material and having a second index of refraction, the difference between the first and the second indices of refraction being variable over a range of values, and means for varying the difference in index of refraction over a portion of the range. When the indices of refraction of the first and second material are substantially the same, the display is substantially transparent. Otherwise it is opaque or substantially less transparent.

10 Claims, 5 Drawing Figures

REFRACTIVE INDEX SWITCHABLE DISPLAY CELL

BACKGROUND OF THE INVENTION

The present invention pertains to the field of passive displays.

Electrophoretic displays are different from other passive displays, e.g. liquid crystal displays and electrochromic displays, because the electrophoretic display operation depends on a macroscopic motion of solid particles rather than a local change in the medium. In theory electrophoretic displays have several advantages: stability should be good because no chemical reactions are involved and a wider choice of materials should be possible because the effect does not depend on the intrinsic properties of the particular material used. In practice, however, electrophoretic displays have several disadvantages: They are not very stable because pigments, dyes and charging agents limit the display lifetime and high voltages are required to achieve fast response times. Thus it would be desirable to develop a new display technology that does not suffer from the disadvantages of the electrophoretic display.

SUMMARY OF THE INVENTION

A display cell having at least two states of different opacity comprises a first material having a first index of refraction, a second material dispersed within the first material and having a second index of refraction, the differencebetween the first and the second indices of refraction being variable over a range of values, and means for varying the difference in index of refraction over a portion of the range. When the indices of refraction of the first and second materials are substantially the same, the display is substantially transparent; otherwise it is opaque or substantially less transparent.

In one embodiment of the present invention a liquid crystal material is imbibed into a thin porous layer, which layer is disposed between transparent electrodes. A voltage source whose value is variable is applied across said electrodes to vary the index of refraction of the liquid crystal from a value which substantially equals the value of the porous material to values which differ.

BRIEF DESCRIPTION OF THE DRAWING

A complete understanding of the present invention may be gained from a consideration of the detailed description presented hereinbelow in connection with the accompanying drawing in which.

DETAILED DESCRIPTION

The present invention pertains to a passive display. A first material having a first index of refraction has a second material dispersed therein. The difference in index of refraction between the first and the second material is variable over a range of values. The display includes means for varying the difference in index of refraction over at least a portion of its range. The display has at least two states of different opacity, which different opacities depend upon the relative values of the indices of refraction of the two materials.

Figure 1:
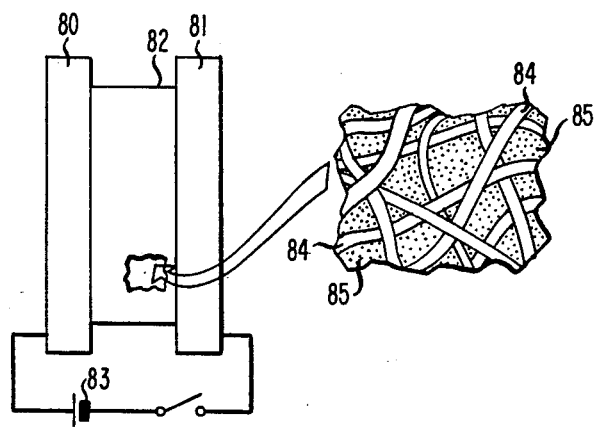
FIG. 1 shows, in pictorial form, an embodiment of the present invention utilizing a liquid crystal material.

FIG. 1 shows, in pictorial form, an embodiment of the present invention. Layer 82 is a 130 $\mu$m thick MILLIPORE type MF porous filter (Millipore Corporation, Bedford, Mass., 01730) made of mixed esters of cellulose 84 and having pores of approximately 5 $\mu$m diameter and a nominal refractive index n=1.495. The filter was imbibed with liquid crystal material 85 in the nematic mesophase, e.g. E. Merck No. 1003 obtained from E. M. Laboratories, Inc., an associate of E. Merck, Darmstadt, Germany, 500 Executive Boulevard, Elmsford, N.Y., 10523. Voltage source 83 was applied across transparent electrodes 80 and 81 to provide an electric field through layer 82. Varying the amplitude of the electric field across layer 82 by varying the value of the voltage from voltage source 83 changed the opacity of layer 82.

Figure 2:
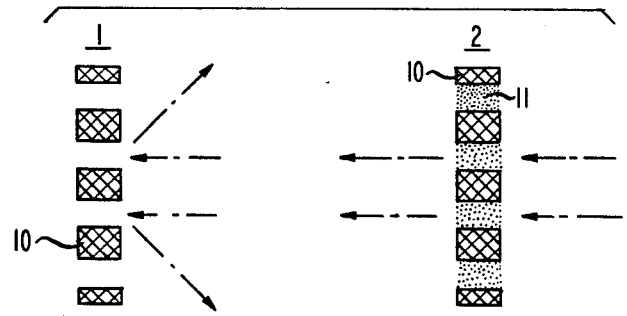
FIG. 2 illustrates, in pictorial form, the physical mechanism according to which the present invention operates.

FIG. 2 shows, in pictorial form, the physical mechanism according to which the display operates. Layer 1 is a nonabsorbing layer comprising solid material 10. Layer 1 is porous on the scale of optical wavelengths. Because of this scale of porosity, layer 1 destroys the spatial coherence of incident radiation and appears white, like e.g. frosted glass. If layer 1 is sufficiently thick, e.g. at least 10 $\mu$m, the porous solid acts as a totally diffusely reflecting surface. Layer 2 in FIG. 2 comprises the same porous solid material as that of layer 1 imbibed with liquid 11 whose index of refraction matches that of material 10. Because of the index matching, layer 2 is now transparent.

Figure 3:
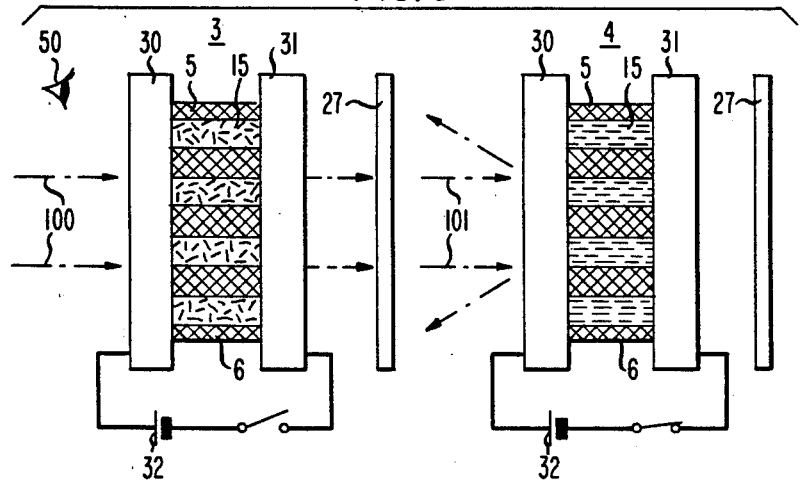
FIG. 3 shows, in pictorial form, an embodiment of the present invention utilizing an anisotropic suspension.

FIG. 3 shows an embodiment constructed according to the present invention. Optically nonabsorbing porous layer 5 comprising solid material 6 is sandwiched between transparent conducting plates 30 and 31, e.g. SnO$_2$ coated glass. Layer 5 is imbibed with liquid 15. The index of refraction of liquid 15 can be varied between different values by the application of different values of an electric field. The different values of electric field are produced by varying the voltage applied to conducting plates 30 and 31 by voltage source 32. The display has varying opacity depending upon the value of the applied electric field. When the index of refraction of solid material 6 and liquid 15 are substantially equal, the display is transparent. Cell 3 in FIG. 3 shows the effect the cell has on incident radiation when the index of refraction of liquid 15 substantially matches that of solid material 6. Light incident upon cell 3 along the direction of arrows 100 passes through cell 3. In FIG. 3 absorber 27 is placed behind cell 3 so that cell 3 appears the color of absorber 27 to an observer positioned at the point shown by eye 50. Cell 4 in FIG. 3 shows the effect the cell has on incident radiation when the index of refraction of liquid 15 does not match that of solid material 6. Light incident upon cell 4 along the direction of arrows 101 is diffusely reflected and the cell appears white under ordinary light. It should be clear to those skilled in the art that both electrodes need not be transparent to make a display. Referring to FIG. 3 it is apparent that only electrode 30 need be transparent. Furthermore, embodiments could be fabricated by using interdigitated electrodes.

In a further embodiment of the present invention illustrated by FIG. 3, liquid 15 comprises an anisotropic suspension. The composition of the suspension is adjusted so that in the random state its refractive index matches that of the solid. This insures transparency at all viewing angles since the random orientation of particles forms an effectively isotropic medium. Colored displays can be fabricated if absorber 27 behind electrode 31 reflects some light back through the display. By applying a d.c. field between the two transparent conductors the particles in the suspension are oriented parallel to the field and the refractive index of the suspension decreases by approximately 2 percent to produce an incoherent diffuse reflection and thus, a frosted appearance (e.g. white under ordinary lighting) of the display. Since the random orientation of the particles produces an optically isotropic medium, the angle of view problem associated with liquid crystal displays is not present.

One appropriate anisotropic suspension is specified as follows. Both the particles and the liquid medium of the suspension are substantially nonabsorbing to radiation in the range of wavelength over which the display is to operate, for example, the visible portion of the light spectrum. The exact size of the particles is not critical but their characteristic length must be much less than that of the wavelength of the radiation, for example, for visible light the characteristic length should be less than or substantially equal to 100 Å. As shown below, the shape of the particles is a fundamental parameter, the preferred shape being needle-like, e.g. prolate ellipsoids. To insure maximum filling of the liquid without significant interparticle contact, the particles should occupy less than or substantially equal to 10 percent of the liquid suspension volume. Lastly, both the static and optical dielectric constants of the particles and the liquid medium should differ as much as possible.

Given these criteria, the suspension is a composite medium to which Maxwell Garnett's theory of dielectric constants, found in an article entitled "Colours in Metal Glasses and in Metallic Films", *Phil. Trans. Rov. Soc.*, London, Vol. 203, pp. 385–420, 1904 by J. C. Maxwell Garnett, can be rigorously applied. Maxwell Garnett's theory gives the expression for the dielectric constant $<\epsilon>$ of the anisotropic suspension:

$$<\epsilon> = [\epsilon_s g + \epsilon_L(f^{-1}-1)]/[g+(f^{-1}-1)] \quad (1)$$

where f is the filling factor, i.e. the ratio of particle volume to liquid medium volume (approximately 10 percent in this case), $\epsilon_s$ and $\epsilon_L$ are the optical dielectric constants of the particles and the liquid medium respectively, and g is a factor which depends on the shape of the particles and their orientation with respect to the electric field. Specifically, consider particles having a prolate ellipsoidal shape in two cases: first, the particles oriented at random and second, the particles oriented with their major axes in the plane parallel to the direction of propagation of the incident radiation. For these cases:

$$g_R = \tfrac{2}{3}g_O + \tfrac{1}{3}[1+L_c(\epsilon_s/\epsilon_L-1)]^{-1} \quad (2)$$

$$g_O = [1+L_a(\epsilon_s/\epsilon_L-1)]^{-1} \quad (3)$$

where the suffixes R and O refer to "Random" and "Oriented" and $L_c$ and $L_a$ are the depolarization factors in the major axis (c) and minor axis (a) directions respectively. Analytic expressions for $L_c$ and $L_a$ as a function of c/a are available in the literature, for example see "Electromagnetic Fields and Interactions", Blackie, 1964, by R. Becker and F. Sauter. Thus, by substituting equations (2) and (3) into equation (1), the refractive indices of the oriented and random states can be calculated.

Figure 4:
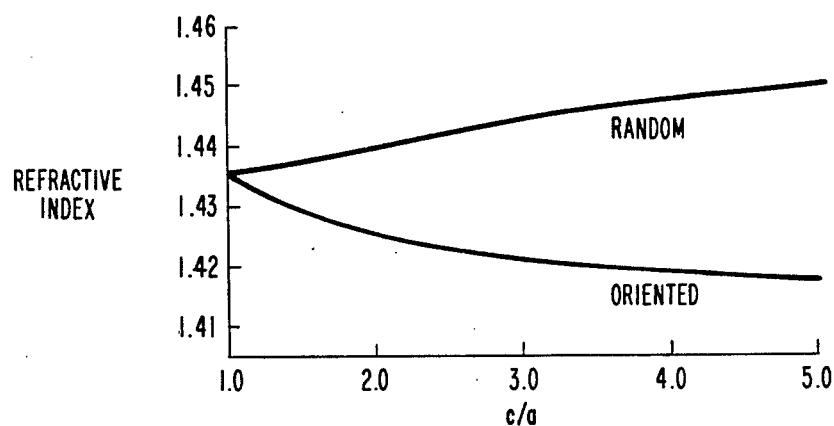
FIG. 4 shows, in graphical form, the refractive index of an anisotropic suspension.

For an illustrative calculation, consider TiO$_2$ ellipsoidal particles suspended in water with f=0.1. TiO$_2$ is transparent, has a high index of refraction ($\sqrt{\epsilon_S}$=2.7) and is inert in H$_2$O ($\sqrt{\epsilon_L}$=1.33). FIG. 4 shows the results of Maxwell Garnett theory calculations of the refractive indices of the TiO$_2$-H$_2$O anisotropic suspension as a function of the axes ratio c/a. It is clear from the figure that refractive index changes of 0.03 or approximately 2 percent can be obtained with a relatively low axes ratio, i.e., 4, which ratio is well within practical limits for material fabrication.

Now consider the dynamics of the orientation process for the anisotropic suspension. Since the static dielectric constants of the particles $\epsilon_S^{(0)}$ and of the liquid medium $\epsilon_L^{(0)}$ are substantially different (e.g. TiO$_2 \sim 14$ and H$_2$O $\sim 80$), a d.c. electric field applied to the suspension polarizes the particles and tends to orient them parallel to the field. Since the viscosity of most liquids is approximately equal to $10^{-2}$ poise, the following display parameters are obtained for particle sizes substantially equal to 100Å: at room temperature a randomization time less than or substantially equal to 1 msec and an orientation time less than or substantially equal to 1 msec for electric fields approximately equal to $10^2$ V/cm. Note that dielectrophoretic forces due to inhomogeneities in the field distribution are negligible compared to the induced polarization torque, see e.g. "Progress in Dielectrics", ed. by J. B. Birkes and J. Hart, published by *Academic Press*, New York, 1965, pp. 3–39.

Figure 5:
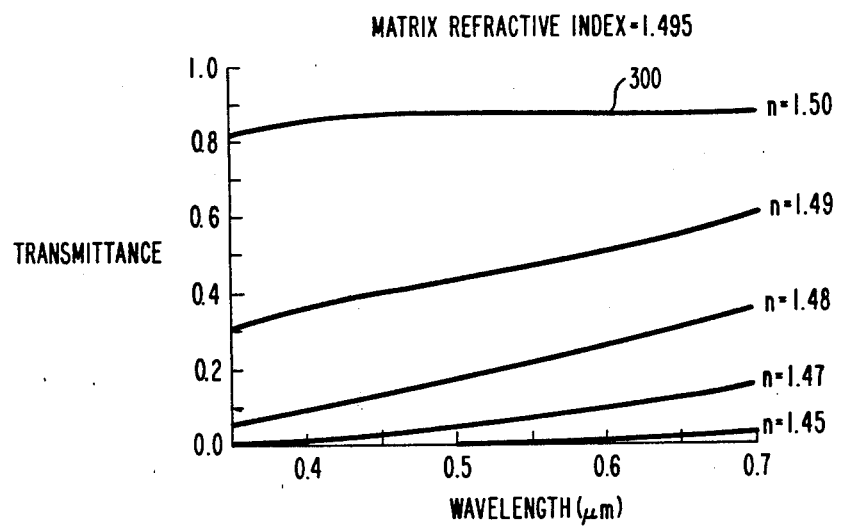
FIG. 5 shows, in graphical form, the transmittance of a porous solid matrix induced by variations in the refractive index of an anisotropic suspension medium disposed within the pores.

Note that relative refractive index changes as small as 2 percent between the two materials can give rise to a variation of transmittance in excess of 10:1 in single pass through the display cell. FIG. 5 shows the unscattered transmittance change induced by refractive index variations as a function of wavelength. The measurements were performed using a Cary 14 spectrophotometer (Varian/Instrument Group, 611 Hansen Way, Palo Alto, Calif. 94303) in the normal transmission mode. The samples consisted of a 130 μm thick MILLIPORE type MF porous filter, described hereinabove with respect to the embodiment shown in FIG. 1, immersed in liquids of varying known refractive indices. Curve 300 in FIG. 5 is the forward transmittance measured when the filter was imbibed with a liquid of almost matching refractive index, i.e., n=1.50. If n is decreased to, e.g. n=1.47, the forward transmittance decreases to less than 5 percent throughout most of the visible. For n=1.45 the transmittance is negligible. The appearance of the samples in the index matched state is like a clear piece of glass. In the nonmatched state the sample appears white with normal lighting, having an opacity which increases with increasing mismatch.

Note that the most general aspect of the present invention is a dispersion of two immiscible phases of materials and means for varying the difference in the indices of refraction between the two phases. This clearly comprehends displays analogous to those discussed hereinabove and based on the modulation of the relative index of refraction of a solid dispersed within a solid, a liquid dispersed within a solid and a first liquid dispersed within a second liquid. However, modulating the index of refraction of a solid by 1–2 percent presently requires single crystals of materials, e.g., Lithium Niobate and very high electric fields, e.g. on the order of 1 Volt/$\mu$m. On the other hand, it is also possible for a solution of large anisotropic molecules to replace the function of the anisotropic suspension in the display configuration described above.

It should also be clear to those skilled in the art that the means for reorienting or altering the index of refraction as discussed hereinabove need not be restricted to one or either of the two materials or to the application of electric fields. The application of pressure, heat, magnetic fields or a photon flux may be used in certain embodiments to vary the relative index of refraction. For example the application of magnetic fields would be suitable for a liquid crystal embodiment and the application of heat would be suitable for causing a phase transition in a material such as napthalene dispersed within a solid.

What is claimed is:

1. A display cell which comprises:
   a first optically nonabsorbing material having a first index of refraction;
   a second optically nonabsorbing material dispersed within said first material and having a second index of refraction, the difference between said first and said second indices of refraction being variable over a range of values; and
   electrode means disposed about a portion of said first optically nonabsorbing material for establishing an electric field in said first and second optically nonabsorbing materials which changes said difference over a portion of said range, so that said display cell has varying degrees of opacity and each degree of opacity is substantially uniform over the visible light spectrum.

2. A display in accordance with claim 1 wherein at least one of said electrodes is transparent.

3. A display in accordance with claim 2 wherein said second optically nonabsorbing material is an anistropic suspension.

4. A display in accordance with claim 2 wherein said second optically nonabsorbing material is a liquid crystal material.

5. A display in accordance with claim 2 wherein said second optically nonabsorbing material is a solution of anisotropic molecules.

6. A display in accordance with claim 2 wherein said second optically nonabsorbing material is a solid material.

7. A display in accordance with claim 6 wherein said solid material is Lithium Niobate.

8. A display cell which comprises:
   a first optically nonabsorbing material having a first index of refraction;
   a second optically nonabsorbing material dispersed within said first material and having a second index of refraction, the difference between said first and said second indices of refraction being variable over a range of values;
   electrode means disposed about a portion of said first optically nonabsorbing material for establishing an electric field in said first and second optically nonabsorbing materials which changes said difference over a portion of said range, so that said display cell has varying degrees of opacity; and
   said second optically nonabsorbing material is an anisotropic suspension comprising $TiO_2$ in $H_2O$.

9. A display cell which comprises:
   a first optically nonabsorbing material having a first index of refraction;
   a second optically nonabsorbing material dispersed within said first material and having a second index of refraction, the difference between said first and said second indices of refraction being variable over a range of values, said second optically nonabsorbing material being a liquid crystal material; and
   means for providing and varying a magnetic field disposed to pass through at least a portion of said liquid crystal material to change said difference over a portion of said range, so that said display cell has varying degrees of opacity and each degree of opacity is substantially uniform over the visible light spectrum.

10. A display cell which comprises:
    a first optically nonabsorbing material having a first index of refraction;
    a second optically nonabsorbing material dispersed within said first material and having a second index of refraction, the difference between said first and said second indices of refraction being variable over a range of values, said second optically nonabsorbing material being napthalene; and
    means for applying heat to said first and second optically nonabsorbing materials to cause a phase transition in said napthalene which changes said difference over a portion of said range, so that said display cell has varying degrees of opacity.

* * * * *